UNITED STATES PATENT OFFICE.

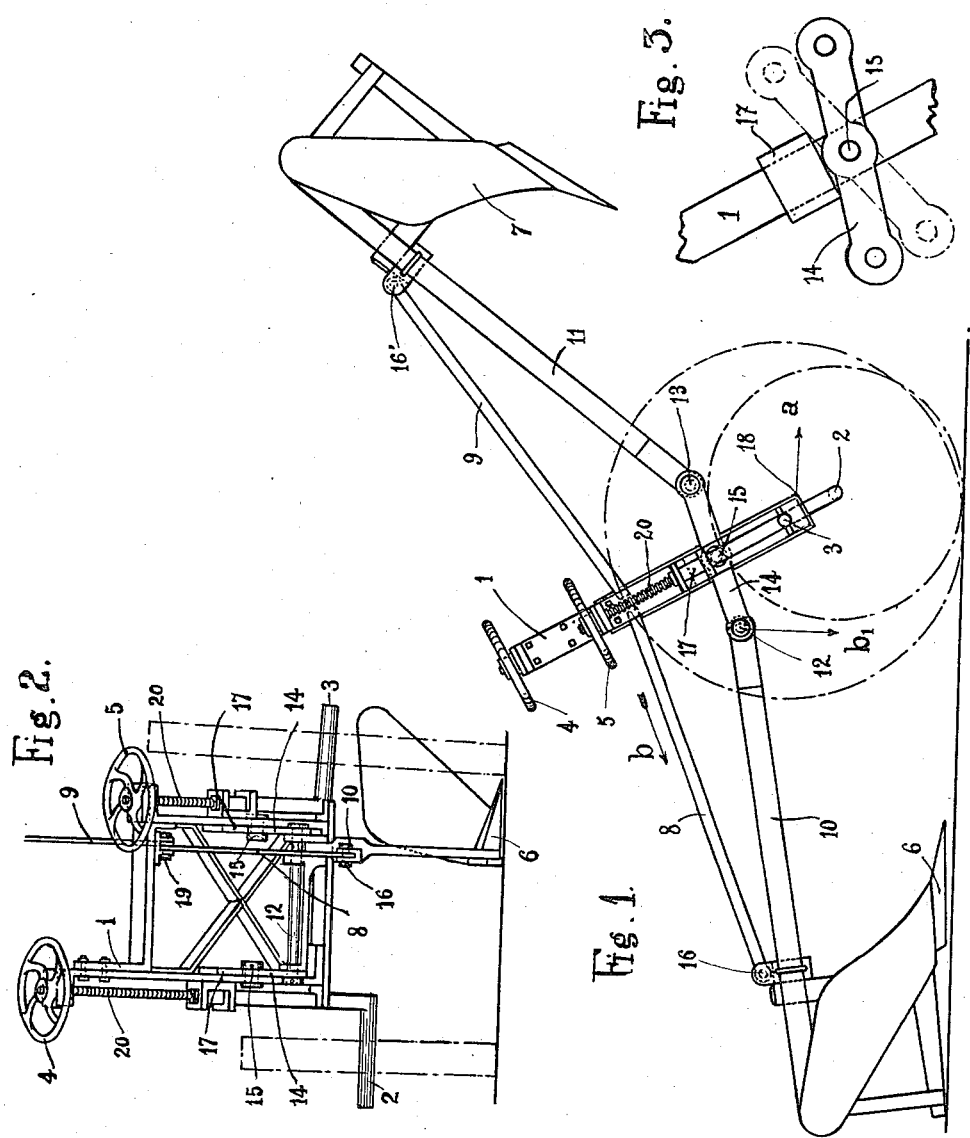

MAURICE LETROTEUR, OF VIRY, FRANCE.

PLOW.

1,150,438.  Specification of Letters Patent.  Patented Aug. 17, 1915.

Application filed July 8, 1913. Serial No. 777,972.

*To all whom it may concern:*

Be it known that I, MAURICE LETROTEUR, subject of the Republic of France, residing at Viry, Aisne, France, have invented certain new and useful Improvements in Plows, of which the following is a specification, reference being had therein to the accompanying drawing.

Oscillating plows, more particularly those with multiple shares, are not particularly well adapted for superficial tilling, the part of the plow in action being unable, if the ground is hard or even very firm, to penetrate the same.

This invention has for its object to remedy the above disadvantage and give the tractive effort used in driving the plow a downward component which will exert a distributed thrust on the member carrying the share or shares at work, thereby making the plow suitable for any plow, whether it be plowing the stubble, superficial plowing, or deep plowing, and whatever the nature of the ground to be tilled.

In the accompanying drawing given by way of example, Figure 1 is a side elevation of the device; Fig. 2 an end elevation; and Fig. 3 a detail view showing one of the equalizing beams and stops.

The fore-carriage 1, mounted on axles 2 and 3, constitutes a frame which can be raised or lowered in the usual manner by means of hand wheels with nuts 4 and 5 adjustable on fixed screw bolts 20. In that way, it is possible to adjust to a suitable height the share 6 occupying a low position, either before the transport of the plow or at the moment of beginning the tilling.

The shares 6 and mold boards 7 are connected to the fore-carriage 1 by link bars 8 and 9 having end pivots 16, 16′ and a central pivot 19. The shares are moreover supported and connected together by carrier beams 10 and 11 which, by means of pins 12 and 13, are connected to two balance beams 14 oscillating about pins 15, their movements being limited by stops 17. Each carrier beam (10 or 11), its link bar (8 or 9), the ends of the beams 14 and the frame of the fore-carriage 1, thus form for each plow a jointed quadrilateral. Traction is secured by a chain (not shown) attached to the point 18, and acting in the direction of an arrow *a* when the lower share 6 shown in Fig. 2 is in action, and in the opposite direction when the other share is lowered and in action. Thus it will be evident that when the share carrier beam 10 is in working position and the beam 11 is in the air the pull applied at 18 will cause the fore-carriage to swing about the fulcrum 3 and produce a thrust in the direction of the arrow *b* through the bar 8 and the beam 14 on both ends of the share carrier beam 10, and on the other hand will raise the share carrier beam 11 which, in the oscillations about the pivot 16′, to which it is necessarily submitted during the plowing action, has the tendency to raise the part 13 in the direction of the arrow *c*, which produces at 12 reaction in the direction of the arrow *b′* having the tendency to lower the front portion of the member 10 of the plow.

It follows from the various above mentioned arrangements and stresses produced therein, that the part 10 carrying the share or shares in working position is pressed against the ground both at the front, which gives it a greater capacity of penetration, and at the back, and, when several shares are mounted on the member 10, the thrust is evenly distributed among them. The plow is thus able to cut properly and to penetrate easily even into hard ground.

Having thus described my invention, what I claim as new is:—

An oscillating plow comprising an oscillatable, wheeled carriage, balance beams centrally pivoted to the carriage, oppositely arranged share carrier beams pivoted at their inner ends to the oppositely projecting arms of the balance beams, means for limiting the relative tilting motion between the carriage and balance beams, and links connecting the outer ends of the carrier beams with the carriage.

In testimony whereof I affix my signature in presence of two witnesses.

MAURICE LETROTEUR.

Witnesses:
 PAUL FOLLIN,
 FRITZ BAUER.

Copies of this patent may be obtained for five cents each, by addressing the "Commissioner of Patents, Washington, D. C."